United States Patent
Jia et al.

(10) Patent No.: US 10,868,422 B1
(45) Date of Patent: Dec. 15, 2020

(54) ACTIVE PROTECTION SYSTEM AND METHOD FOR PHOTOVOLTAIC DIRECT CURRENT DISTRIBUTION SYSTEM

(71) Applicant: NORTH CHINA ELECTRIC POWER UNIVERSITY, Beijing (CN)

(72) Inventors: Ke Jia, Beijing (CN); Tianshu Bi, Beijing (CN); Congbo Wang, Beijing (CN)

(73) Assignee: North China Electric Power University, Beijing (CN)

( * ) Notice: Subject to any disclaimer, the term of this patent is extended or adjusted under 35 U.S.C. 154(b) by 0 days.

(21) Appl. No.: 16/935,937

(22) Filed: Jul. 22, 2020

Related U.S. Application Data

(63) Continuation of application No. PCT/CN2020/094914, filed on Jun. 8, 2020.

(51) Int. Cl.
  *H02J 1/10* (2006.01)
  *H02S 40/36* (2014.01)
  *H02M 1/32* (2007.01)
  *H02S 40/32* (2014.01)
  *H02S 40/34* (2014.01)

(52) U.S. Cl.
  CPC ............. *H02J 1/106* (2020.01); *H02M 1/32* (2013.01); *H02S 40/32* (2014.12); *H02S 40/34* (2014.12); *H02S 40/36* (2014.12)

(58) Field of Classification Search
  CPC .......... H02J 1/106; H02S 40/32; H02S 40/34; H02S 40/36; H02M 1/32
  USPC ........................................ 307/23; 361/62, 58
  See application file for complete search history.

(56) References Cited

U.S. PATENT DOCUMENTS

| | | | | |
|---|---|---|---|---|
| 10,161,986 B2* | 12/2018 | Schweitzer, III | ...... | G01R 31/50 |
| 10,308,140 B2* | 6/2019 | Meng | ..................... | B60M 1/307 |
| 2003/0085715 A1* | 5/2003 | Lubkeman | ........... | G01R 31/086 |
| | | | | 324/509 |

* cited by examiner

*Primary Examiner* — Michael R. Fin
(74) *Attorney, Agent, or Firm* — Hunton Andrews Kurth LLP

(57) ABSTRACT

A detection and location-based active protection method for flexible DC distribution systems with multi-terminal distributed photovoltaic sources is disclosed. The disclosed protection method actively utilizes the coordinated control between local protection and the converters in the DC distribution system. The converter can then be modified to become an injection source with characteristic signal, providing a known fault signal to build a clear protection boundary. The disclosed protection method can distinguish the correct faulted area by calculating the harmonic impedance of the characteristic signals. Compared with existing DC protection techniques, this disclosed method does not require additional injection equipment and modification of the DC distribution system configuration, nor does it need high data sampling frequency. The disclosed technique is also unaffected by measuring noise and cable-distributed capacitance. The disclosed protection method is therefore feasible for industry application in a large and complex DC network.

2 Claims, 8 Drawing Sheets

ACTIVE PROTECTION SYSTEM AND METHOD FOR PHOTOVOLTAIC DIRECT CURRENT DISTRIBUTION SYSTEM

TECHNICAL FIELD

The present disclosure relates generally to fault location and protection of power distribution system, and more particularly, to active protection systems and methods for photovoltaic direct current (DC) distribution systems.

BACKGROUND

Multi-terminal and distributed DC power systems have been studied and developed extensively. They display numerous advantages over existing alternating current (AC) networks, including higher energy efficiency and power quality, as well as improved reliability, energy system integration, and eco-friendliness. Moreover, DC distribution systems have the potential to support future smart grids by facilitating a high penetration of distributed renewables and DC loads. While the advantages of DC architecture are significant, providing adequate protection for multi-terminal and distributed DC systems is inhibited by factors including a lack of accurate fault detection, location, and fast isolation of faulted areas, along with no distinct standards and guidelines.

SUMMARY

Aspects of the disclosed technology include active protection systems and methods for photovoltaic DC distribution systems.

Embodiments of the present disclosure provide a fault detection and location-based active protection system for a flexible DC distribution power system with multiple photovoltaic (PV) terminals. The system may comprise: a plurality of DC/DC converters, each DC/DC converter configured to connect one of the multiple PV terminals to the flexible DC distribution power system, and the plurality of DC/DC converters configured to be in signal communication with one another throughout the flexible DC distribution power system; a DC/alternating current (AC) converter configured to connect the flexible DC distribution power system to an AC power grid to allow bidirectional power flow between the AC power grid and the flexible DC distribution power system; a first DC circuit breaker positioned on a DC cable connecting one of the plurality of DC/DC converters to the flexible DC distribution power system; a second DC circuit breaker positioned on a DC cable connecting the flexible DC distribution power system to the DC/AC converter; and a controller in signal communication with the flexible DC distribution power system. The controller may be configured to: monitor and measure an output current value of each DC/DC converter at a measurement point located between the DC/DC converter and its corresponding DC cable connecting to the flexible DC distribution power system, a current value of the first DC circuit breaker, and a current value of the second DC circuit breaker; determine whether the output current value is greater than a self-protection current threshold of a corresponding DC/DC converter, whether the current value of the first DC circuit breaker is greater than a current threshold of the first DC circuit breaker, and whether the current value of the second DC circuit breaker is greater than a current threshold of the second DC breaker; in response to detecting at least one selected from the group of: the output current value is greater than the self-protection current threshold of the corresponding DC/DC converter, the current value of the first DC circuit breaker is greater than the current threshold of the first DC circuit breaker, and the current value of the second DC circuit breaker is greater than the current threshold of the second DC breaker, transmit a blocking signal to the plurality of DC/DC converters and the DC/AC converter to block the plurality of DC/DC converters and the DC/AC converter, and to disconnect the first and second DC circuit breakers; transmit an unblocking signal to a first DC/DC converter of the plurality of DC/DC converters to unblock the first DC/DC converter; change a switching frequency of the first DC/DC converter to cause the first DC/DC converter to produce a first harmonic output current waveform comprising a first characteristic frequency corresponding to the switching frequency of the first DC/DC converter; measure the first harmonic output current waveform at the measurement point located between the first DC/DC converter and its corresponding DC cable connecting to the flexible DC distribution power system; apply fast Fourier transform (FFT) to the first harmonic output current waveform to extract from the first harmonic output current waveform a harmonic voltage value and a harmonic current value corresponding to the first characteristic frequency; determine, based on the harmonic voltage value and the harmonic current value, a harmonic impedance value between the measurement point of the first DC/DC converter and a fault point; determine, based on the harmonic impedance, a fault distance between the measurement point of the first DC/DC converter and the fault point; cause the first DC/DC converter to transmit the unlocking signal to a second DC/DC converter of the plurality of DC/DC converter to unlock the second DC/DC converter, wherein the second DC/DC converter is selected such that the fault point is located between the first DC/DC converter and the second DC/DC converter; change a switching frequency of the second DC/DC converter to cause the second DC/DC converter to produce a second harmonic output current waveform comprising a second characteristic frequency corresponding to the switching frequency of the second DC/DC converter, wherein the second characteristic frequency is different than the first characteristic frequency; measure an output current waveform at a measurement point located between the first DC/DC converter and the second DC/DC converter; apply the FFT to the output current waveform to extract from the output current waveform a maximum frequency; determine whether the maximum frequency is equal to the second characteristic frequency; in response to that the maximum frequency is equal to the second characteristic frequency, locate the fault point to be between the first DC/DC converter and the measurement point at which the output current waveform is measured; in response to that the maximum frequency is not equal to the second characteristic frequency, locate the fault point to be between the second DC/DC converter and the measurement point at which the output current waveform is measured; block the first and second DC/DC converters; and restore the flexible DC distribution power system.

Embodiments of the present disclosure provide a fault detection and location-based active protection method for a flexible direct current (DC) distribution power system with multiple photovoltaic (PV) terminals. The flexible DC distribution power system may comprise: a plurality of DC/DC converters, each DC/DC converter configured to connect one of the multiple PV terminals to the flexible DC distribution power system, and the plurality of DC/DC converters configured to be in signal communication with one another throughout the flexible DC distribution power system; a DC/alternating current (AC) converter configured to connect the flexible DC distribution power system to an AC power grid to allow bidirectional power flow between the AC power grid and the flexible DC distribution power system; a first DC circuit breaker positioned on a DC cable connecting one of the plurality of DC/DC converters to the flexible DC distribution power system; a second DC circuit breaker positioned on a DC cable connecting the flexible DC distribution power system to the DC/AC converter; and a controller in signal communication with the flexible DC distribution power system. The method may comprise: monitoring and measuring, by the controller, an output current value of each DC/DC converter at a measurement point located between the DC/DC converter and its corresponding DC cable connecting to the flexible DC distribution power system, a current value of the first DC circuit breaker, and a current value of the second DC circuit breaker; determining, by the controller, whether the output current value is greater than a self-protection current threshold of a corresponding DC/DC converter, whether the current value of the first DC circuit breaker is greater than a current threshold of the first DC circuit breaker, and whether the current value of the second DC circuit breaker is greater than a current threshold of the second DC breaker; in response to detecting at least one selected from the group of: the output current value is greater than the self-protection current threshold of the corresponding DC/DC converter, the current value of the first DC circuit breaker is greater than the current threshold of the first DC circuit breaker, and the current value of the second DC circuit breaker is greater than the current threshold of the second DC breaker, transmitting, by the controller, a blocking signal to the plurality of DC/DC converters and the DC/AC converter to block the plurality of DC/DC converters and the DC/AC converter, and to disconnect the first and second DC circuit breakers; transmitting, by the controller, an unblocking signal to a first DC/DC converter of the plurality of DC/DC converters to unblock the first DC/DC converter; changing, by the controller, a switching frequency of the first DC/DC converter to cause the first DC/DC converter to produce a first harmonic output current waveform comprising a first characteristic frequency corresponding to the switching frequency of the first DC/DC converter; measuring, by the controller, the first harmonic output current waveform at the measurement point located between the first DC/DC converter and its corresponding DC cable connecting to the flexible DC distribution power system; applying, by the controller, fast Fourier transform (FFT) to the first harmonic output current waveform to extract from the first harmonic output current waveform a harmonic voltage value and a harmonic current value corresponding to the first characteristic frequency; determining, by the controller based on the harmonic voltage value and the harmonic current value, a harmonic impedance value between the measurement point of the first DC/DC converter and a fault point; determining, by the controller, based on the harmonic impedance, a fault distance between the measurement point of the first DC/DC converter and the fault point; cause, by the controller, the first DC/DC converter to transmit the unlocking signal to a second DC/DC converter of the plurality of DC/DC converter to unlock the second DC/DC converter, wherein the second DC/DC converter is selected such that the fault point is located between the first DC/DC converter and the second DC/DC converter; changing, by the controller, a switching frequency of the second DC/DC converter to cause the second DC/DC converter to produce a second harmonic output current waveform comprising a second characteristic frequency corresponding to the switching frequency of the second DC/DC converter, wherein the second characteristic frequency is different than the first characteristic frequency; measuring, by the controller, an output current waveform at a measurement point located between the first DC/DC converter and the second DC/DC converter; applying, by the controller, the FFT to the output current waveform to extract from the output current waveform a maximum frequency; determining, by the controller, whether the maximum frequency is equal to the second characteristic frequency; in response to that the maximum frequency is equal to the second characteristic frequency, locating, by the controller, the fault point to be between the first DC/DC converter and the measurement point at which the output current waveform is measured; in response to that the maximum frequency is not equal to the second characteristic frequency, locating, by the controller, the fault point to be between the second DC/DC converter and the measurement point at which the output current waveform is measured; blocking, by the controller, the first and second DC/DC converters; and restoring, by the controller, the flexible DC distribution power system.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
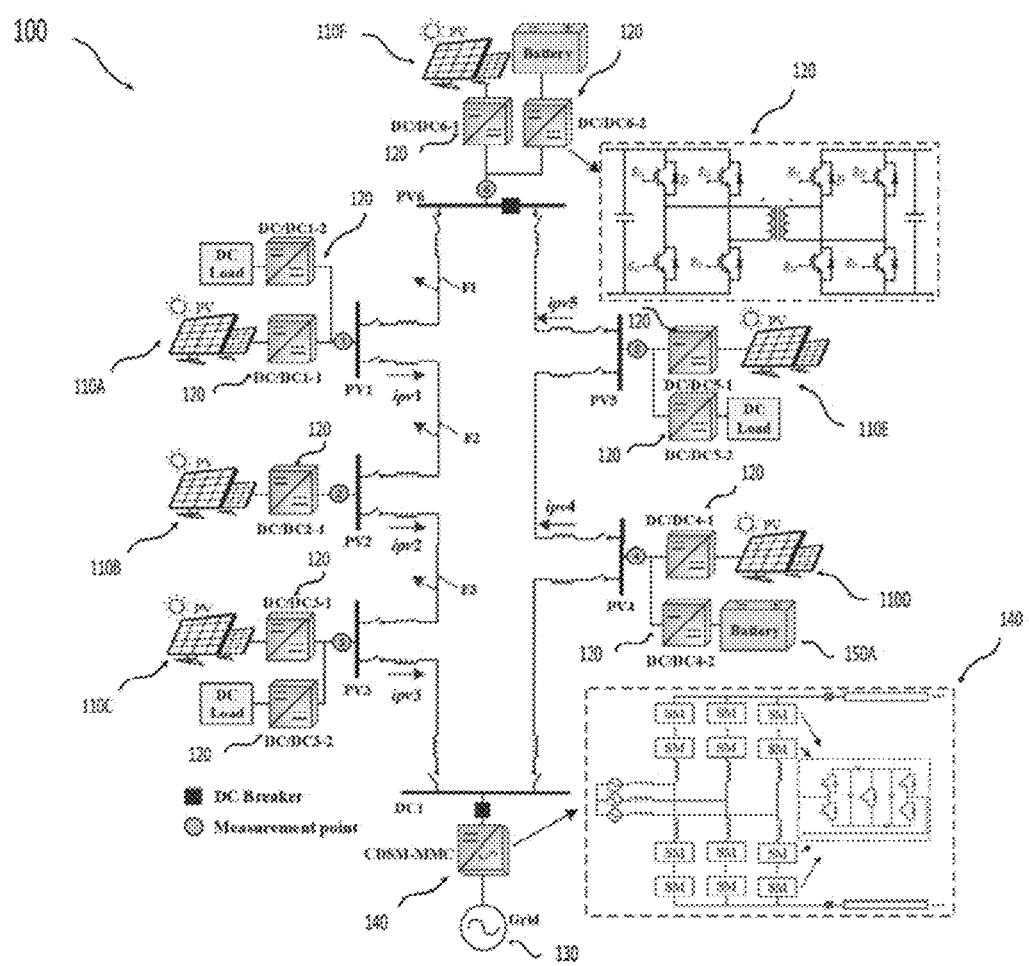
FIG. 1 shows an example structure diagram of a multi-terminal flexible DC distribution system according to an embodiment of the present disclosure.

Exemplary embodiments of the invention will now be described in order to illustrate various features of the invention. The embodiments described herein are not intended to be limiting as to the scope of the invention, but rather are intended to provide examples of the components, use, and operation of the invention. The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

I. INTRODUCTION

A flexible DC distribution system contains both voltage-source converters (VSCs) and DC/DC converters. The topological structure of different converters has individual requirements for system protection performance in a flexible DC distribution system. Without an additional fault current limiter, DC circuit breaker, or both, converters such as modular multilevel converter (MMC), two-level VSC, and direct-current transformer (DCT), are vulnerable to DC faults. To improve fault current extinguishing ability, a clamp double sub-module modular multilevel converter (CDSM-MMC) topology and dual-active bridge unit transformer (DAB) with a strong ability to block fault current have been utilized together in many recent projects. The major challenge for protection is that DC fault current blocking procedure normally takes place within 1-2 millisecond (ms), and the DC distribution system cannot provide effective fault information for protection after blocking. That is to say, the fault area will not be detected if the DC protection does not work within 1 ms. This means the DC distribution system will not be restored quickly, which can jeopardize renewable power supply efficiency.

In the literature, for single-end measurement-based protection (non-unit protection) which does not require communication, the faulty line can be identified with only local measurements. Current derivative (di/dt & d2i/dt2) based on fault detection has been applied to detect fast-changing DC fault currents with satisfactory results. However, such methods depend on high-bandwidth measurement devices. Alternatively, under-voltage, voltage derivative, and current derivative criteria can be combined. However, these protections fail to provide a clearly protected boundary, which would affect relay operation selectivity. The voltage and the voltage changing rate on the limiting reactor have been utilized as the protection criteria to achieve the selectivity requirement. However, reactors located at the DC side may affect the dynamic performance of VSC-DC distribution. The protections can therefore only be utilized in a special system equipped with DC-limiting reactors. Alternatively, wavelet analysis of current and voltage as well as voltage derivatives have been combined to form protection criteria. In summary, without a clear boundary, it will be difficult for single-end measurement-based protection to identify all faults on the protected line within several milliseconds.

In addition, the methods based on travelling waves can locate faults within a short period of time. The methods calculate the fault distance by recording the time difference between the arrival time of the first and second reverse travel wave. However, the cables in DC distribution systems are typically much shorter than those in transmission systems. In order to accurately compute surge arrival time or natural frequency, a very high sampling rate is needed. Meanwhile, the methods can offer fault distance estimation but are strict with the number and position of measuring points. And the positioning accuracy can be greatly affected by the multiple branches of the DC distribution networks.

Most active injection methods are proposed in the low voltage and medium voltage DC grid. The active injection methods install additional devices and acquire the specific signal injection for fault detection and location. Their main drawback is additional equipment that might be not allowed by utilities for reliability reasons. Moreover, when the structures of branches are complex in the DC distribution networks, the positioning results are prone to getting the false fault points. In addition, the research of DC islanding detection methods also mainly focuses on active methods of active power disturbance injection based on DC/DC converters. In order to make the DC voltage quickly exceed the detection threshold after islanding, the above methods require DC/DC converters at each photovoltaic (PV) source to perform injection simultaneously to ensure sufficient disturbance intensity. Hence, active methods detect islanding by injecting small disturbance signals into the steady DC system and measuring the response and the entire process of detection remains constant. In other words, the small disturbance signals are always injected into the steady DC system. Hence, active islanding detection methods is not suitable for a DC distribution system with short-circuit faults.

Protections that require communication channels and remote end information (unit protection) have clear protection zones. Differential protections with double-terminal measurement requires accurate current measurements and high-fidelity data synchronization. Additionally, the transient current of line-distributed capacitance can affect the reliability of differential protection. In this regard, the differential protections are tailored to low voltage VSC-DC micro-grids in which cable-distributed capacitance would not be a problem due to short power distribution cables. A transverse differential protection may be considered for pole-to-ground faults, which is immune to line-distributed capacitance. However, this method becomes invalid for pole-to-pole faults. A low-pass filter can remove the transient current of the line-distributed capacitor, but would affect the protection speed. Alternative research has proposed pilot protection based on the transient voltage of DC-limiting reactors, and an event-based protection scheme has identified faults in the current-changing rate with the help of communication. Both types of protection have demonstrated satisfactory performance, but they can only be utilized in a system with limiting reactors. Therefore, developing a new protection principle with good selectivity and reliability is essential.

The reasons for the poor performances of existing protection schemes in the DC distribution system with multi-terminal distributed PV sources can be summarized as the followings. The single-end measurement-based protection is unable to provide a clearly protected boundary, which would affect relay operation selectivity. This is particularly true when used in the complex structure of a DC distribution system with multi terminals and branches. It is difficult for a single-end measurement-based protection to identify all types of faults on a protected cable in several milliseconds without a clear boundary. The unit protection has well-defined protection boundaries and can meet the requirements of selectivity. However, the protection operation speed for the converter is constrained to 2-3 ms or less (the fault information provided for protection is limited) due to the fact that the power electronic device is switched off soon after the DC fault occurs. Considering the data processing time and communication delay, the unit protection may not be able to meet the operation speed of a DC distribution system with more converters.

To cure the deficiencies described above, the present disclosure provides a system and method for a novel fault detection and location method-based active protection for flexible DC distribution systems with multi-terminal PV sources. The advantages of the present disclosure may include, but not limited to, the followings. Some DC protections rely solely on the fault transient which disappears quickly (in about 1-2 ms) due to converter self-protection, and are highly non-linear due to the converter controls. However, the disclosed protection system and method herein utilize a coordinated control between local protection and the converters in the DC distribution system, thereby the converters in the DC distribution system can be turned into an injection source with characteristic signal. This can provide a known fault signal to build a clear protection boundary. Most existing DC protections focus on distinguishing the faulted line section. After the faulted line is isolated, it still takes a significant amount of time to identify the exact fault point to remove the fault. The disclosed protection system and method herein can identify the correct faulted area by calculating the harmonic impedance of these characteristic signals. The disclosed protection system and method herein can significantly reduce the fault restoration time, improve the output efficiency of the renewable power source, and maintain the load power supply. The performance of the disclosed protection system and method herein is compared with the performance of existing methods. In terms of speed, the non-unit protections may have more advantage because they have no communication delay. In terms of selectivity, the unit protections may naturally have a clear boundary. In terms of reliability, the active protection and the disclosed protection herein are good options. In terms of selectivity, the unit protections can trip the fault with high resistance. In terms of economy, the non-unit protections may have more advantage. In terms of fault location accuracy, the traveling wave protection, the active protection and the disclosed protection herein can offer good results. Compared with the traveling wave protection and other active protections, the disclosed technique herein does not require additional injection equipment or modification of the DC distribution system configuration, nor does it need a high data sampling frequency. Simulation results show that the disclosed protection system and method herein are effective to achieve the combination of control and protection through the controllability of power electronics. The disclosed protection system and method herein are straightforward and reliable, and their features are demonstrated to be feasible for industry application in a large and complex DC network.

II. ANALYSIS OF THE CONVERTER FAULT PROCESS

FIG. 1 illustrates an example multi-terminal DC distribution system 100 according to an embodiment of the present disclosure. For example, a multi-terminal DC distribution system based practical project in Zhangbei County, China, is selected as the research object in the present disclosure. The six photovoltaic power plants 110A, 110B, 11C, 110D, 110E and 110F in the DC distribution system 100 are connected to +10 kV through the DAB 120 on-site, and then connect with each other via DC cables to form a ring system. Among them, the DAB 120 is composed of H bridges on both sides, and a high-frequency transformer. The voltage on each side of the DAB 120 can be controlled by adjusting the pulse width of the H bridges, and the high-frequency transformer acts as an electrical isolation component. The main purpose of using dual-direction topology DABs is to provide the DC distribution system 100 with improved expansion capabilities in the future. The dual-direction topology DABs are particularly necessary when there is more distributed DC load on the low-voltage photovoltaic side, or if new energy power (such as energy storage systems) must be connected to the DC grid.

The ring system formed after the connection of the multi-terminal distributed photovoltaic power plants 100A, 110B, 110C, 110D, 110E and 110F is connected with the AC system 130 through CDSM-MMC 140 to achieve bidirectional power flow of the AC and DC system. The AC/DC converter adopts constant DC voltage control in the DC distribution system and the working mode for the DABs in normal operation is equivalent to a current source. The DC distribution system 100 also contains two 1 WM energy storage devices 150A and 150B to balance the photovoltaic power output. At the same time, to ensure that the converter equipment is not damaged during the interruption of the fault current by the DC breaker, a 1 mH current limiting reactor is configured at the outlet of each photovoltaic port which limits the fault impact current to a certain extent. Detailed parameters of the topological DC distribution system 100 are provided in Table 1 and Table 2.

TABLE 1

PARAMETERS OF CONVERTERS

| Parameter Name | Voltage Ratio | Power Capacity | Control Strategy |
|---|---|---|---|
| AC/DC | AC10 kV/DC10 kV | 10 MW | Constant voltage |
| DC/DC1-1 | DC10 kV/DC750 V | 5 MW | MPPT |
| DC/DC2-1 | DC10 kV/DC750 V | 2 MW | MPPT |
| DC/DC3-1 | DC10 kV/DC750 V | 2 MW | MPPT |
| DC/DC4-1 | DC10 kV/DC750 V | 4 MW | MPPT |
| DC/DC5-1 | DC10 kV/DC750 V | 3 MW | MPPT |
| DC/DC6-1 | DC10 kV/DC750 V | 0.5 MW | MPPT |
| DC/DC1-2 | DC10 kV/DC750 V | 1.5 MW | Constant power |
| DC/DC3-2 | DC10 kV/DC750 V | 1.5 MW | Constant power |
| DC/DC4-2 | DC10 kV/DC750 V | 2 MW | Constant power |

TABLE 1-continued

PARAMETERS OF CONVERTERS

| Parameter Name | Voltage Ratio | Power Capacity | Control Strategy |
| --- | --- | --- | --- |
| DC/DC5-2 | DC10 kV/DC750 V | 1 MW | Constant power |
| DC/DC6-2 | DC10 kV/DC750 V | 1 MW | Constant power |

TABLE 1

PARAMETERS OF DC CABLES

| End | Bus name Head | Length /km | Resistance (Ω)/km | Inductance (mH)/km | Capacitance (uF)/km |
| --- | --- | --- | --- | --- | --- |
| PV1 | PV2 | 2 | 0.0293 | 0.3 | 0.0073 |
| PV2 | PV3 | 2 | 0.0293 | 0.3 | 0.0073 |
| PV3 | DC1 | 2 | 0.0293 | 0.3 | 0.0073 |
| DC1 | PV4 | 10 | 0.0293 | 0.3 | 0.0073 |
| PV4 | PV5 | 4 | 0.0293 | 0.3 | 0.0073 |
| PV5 | PV6 | 1 | 0.0293 | 0.3 | 0.0073 |
| PV6 | PV1 | 2 | 0.0293 | 0.3 | 0.0073 |

Control and protection of the multi-terminal DC distribution system 100 is realized through the communication of the converters. The unit layer controls (controls of the DC/DC converters) have the ability to switch the modulation frequency of the local converter. Coordination and cooperation between multiple converters can be achieved by system communications. Hence, the control signal can be sent to each converter in the multiple converters system. The inter-station coordination communication network (Generic Object Oriented Substation Event, GOOSE technology) is used to realize the information transfer between the local protection and the converters. Hence, in this disclosure, the local converter can be turned into an injection source with a characteristic frequency signal by changing the modulation frequency of the local converter (after the fault).

Generally, DC-side neutral points are connected to earth through high impedances in practical engineering. For the line-to-ground fault, the fault line is clamped to zero potential, and due to the support of the converter sub-module capacitor, the un-faulted pole voltage rises to twice the pre-fault voltage, but the voltage between the poles remains unchanged. In this case, DC line-to-ground faults do not cause damaging overcurrent. Currently, research on DC line protection mostly focuses on the methods for pole-to-pole faults, such as the methods described in the introduction section of this disclosure. Therefore, there is a separate protection scheme for line to ground faults in DC distribution systems. According to the fault characteristics of voltage offset, DC voltage unbalance protection is configured for line-to-ground fault. Thus, this disclosure mainly focuses on DC pole-to-pole faults and the single-line to ground faults that cause non-fault current may not be the focus of this disclosure.

A. Fault Characteristics of CDSM-MMC

Figure 2:
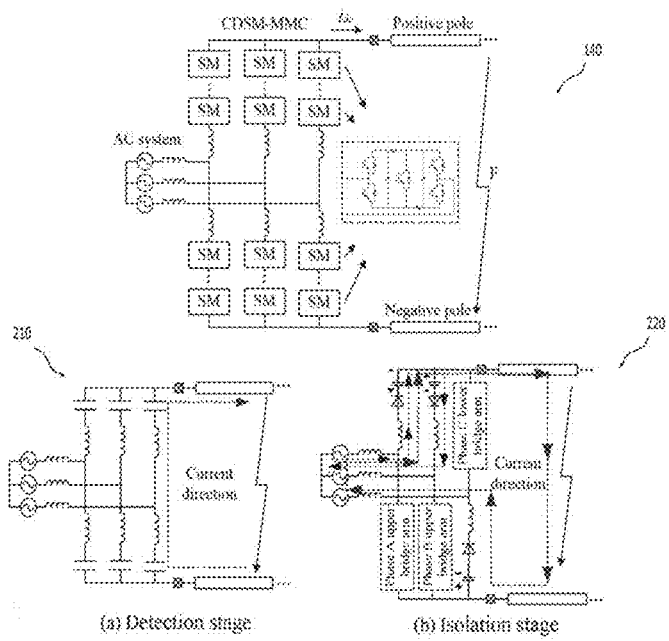
FIG. 2 shows example equivalent circuits of a clamp double sub-module modular multilevel converter (CDSM-MMC) during different fault stages according to an embodiment of the present disclosure.

During a pole-to-pole fault of a CDSM-MMC converter, the fault transient can be divided into two stages according to the fault progression time, namely the DC fault "detection stage" and the DC fault "isolation stage", as shown in FIG. 2 in which equivalent circuits of CDSM-MMC 140 are illustrated during different fault stages.

Stage 1: Fault detection stage. During the "detection stage", the equivalent circuit 210 is a second-order function for solid faults as shown in FIG. 2. The circuit natural response provides an oscillation under the condition of $\delta < 2\sqrt{L/C}$, where L represents the equivalent value of bridge arm reactor inductance, C is the equivalent capacitance of the converter, and R denotes the series resistance in the capacitor and contact resistance in the discharge circuit. When the initial condition of the equivalent sub-module capacitor voltage is $U_{dc}$ and the load current is $I_0$, the natural response can be presented as:

$$\begin{cases} i_{dc}(t) = \frac{U_{dc}}{\omega L}e^{-\delta t}\sin(\omega t) - \frac{I_0 \omega_0}{\omega}e^{-\delta t}\sin(\omega t - \beta) \\ u_C(t) = \frac{U_{dc}\omega_0}{\omega}e^{-\delta t}\sin(\omega t + \beta) - \frac{I_0}{C\omega}e^{-\delta t}\sin(\omega t) \\ \beta = \arctan\left(\frac{\omega}{\delta}\right) \end{cases} \quad (1)$$

where $i_{dc}(t)$ is the instantaneous current of positive pole line, $u_c(t)$ is the voltage of the capacitor, and their positive direction is defined from converter to fault point as shown in FIG. 2. The δ represents attenuation factor (δ=R/2 L), ω is the oscillation angular frequency ($\omega = \sqrt{1/LC - (R/2L)^2}$), and ω0 represents the inherent angular frequency ($\omega_0 = \sqrt{\delta^2 + \omega^2}$). The converter self-protection operates at twice the rated current in approximately 1 ms, blocking the gate signal immediately, at which point the "detection stage" is finished and the next stage begins.

Stage 2: Fault isolation stage. During the "isolation stage", the equivalent circuit 220 is illustrated in FIG. 2, and the series/parallel capacitance voltage provides the fault circuit with directional potential after converter blocking. The fault current of the bridge arm has two paths in different directions, as shown in FIG. 2. Fault path 1 consists of the Phase A upper bridge arm and Phase B upper bridge arm, while fault path 2 is formed by Phase A upper arm and Phase C lower bridge arm. Therefore, the fault currents decrease to zero during fault isolation stage as all currents are forced inflow to the capacitor of the sub-module. At the same time, the capacitor voltage increases.

B. Fault Characteristics of DAB

Figure 3:
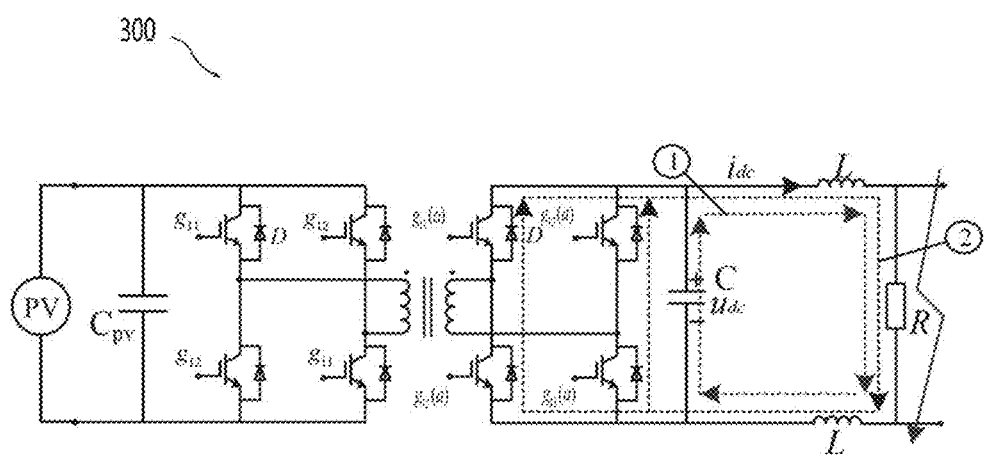
FIG. 3 shows example equivalent circuits of a dual-active bridge unit transformer (DAB) under pole-to-pole fault according to an embodiment of the present disclosure.

Regardless of the working mode of the DAB converter, the fault transients can be divided into two stages according to the fault progression time during a pole-to-pole fault of a DAB converter. This is the DC fault "detection stage" and the DC fault "isolation stage", as shown in FIG. 3. It is assumed that the DC/DC module of the PV voltage rising transformer on the site is only composed of a single DAB sub-module. The equivalent circuit 300 of the DAB converter is shown in FIG. 3, in which the DC cable pole-to-pole fault occurs.

Stage 1: Fault detection stage. The energy stored in the outlet capacitor is quickly discharged to the fault point when the DC cable pole-to-pole fault occurs, and the fault current rises quickly to the peak value. Hence, this operation can also be called the capacitor discharge process. The path is shown in line 1 of FIG. 3, and the circuit can be taken as equivalent to a RLC oscillating circuit. In other words, the circuit is under the condition of an under-damped response.

Stage 2: Fault isolation stage. The current rises rapidly to reach the self-protection value of insulated-gate bipolar transistor (IGBT) in DAB, then the DC/DC transformer is blocked. After blocking, the fault current forms a continuous flow path through the reactor and the reverse parallel diode in the H bridge. The path is shown in line 2 in FIG. 3. Due to the electrical isolation of the high frequency transformer in the DAB module, the DC fault current gradually attenuates to zero after DAB is blocked.

In summary, according to the analysis of the fault process, the isolation stage is unable to provide effective fault transient for protection because the DC cable fault current is zero (Both CDSM-MMC and DAB have isolation stages). The output frequency characteristics of the converter are analyzed in next section. The converter control is then modified to inject characteristic signal by changing the modulation frequency of the converter after the fault. The fault detection and location are achieved by the calculation and detection of these characteristic signals.

III. PROTECTION METHOD BASED ON COORDINATION OF CONTROL AND PROTECTION

A. Location of the Singe-End Fault Distance

The working principle of DAB is to use a pulse width modulation (PWM) signal (square wave) with a constant frequency to control IGBT on and off in the H bridge. In the traditional PWM control mode, the switching frequency of the PWM signal does not change. A change of the switching frequency will cause a change in the output frequency. Thus, the switching frequency in the DAB determines the frequency of the output harmonic waveform. This disclosure alters the switching frequency of DAB by controlling the switching (changing the frequency of PWM trigger pulse) so it can output a fixed unique harmonic component. The output frequency of DAB can be regarded as self-defined harmonic source. In this way, by measuring the faulted harmonic line impedance between the DAB and the fault, the fault distance can be estimated.

Figure 4:
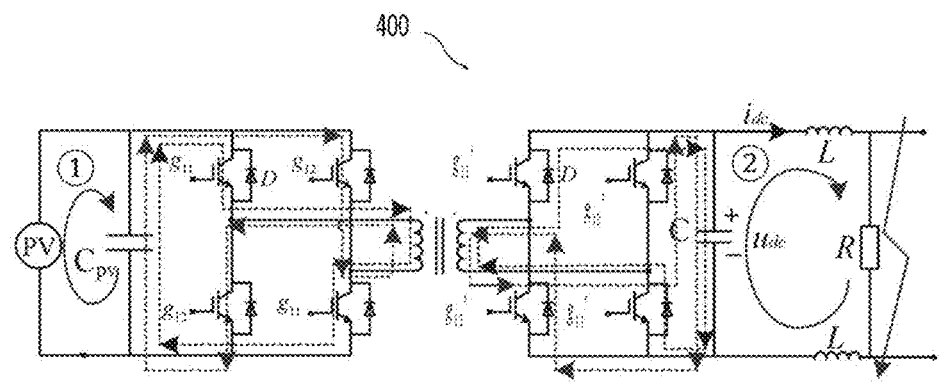
FIG. 4 shows example equivalent circuits of steady state after fault according to an embodiment of the present disclosure.

For the output frequency of DAB used as a source of harmonic waveforms, DAB must be unblocked after the fault occurs. When the DAB is used as a harmonic source after the fault, it must be unblocked. In this case, the capacitor discharge process of DAB will re-start and will gradually enter a new steady state. Its equivalent circuit 400 is illustrated in FIG. 4.

Where, $C_{PV}$ represents the equivalent capacitance at the low voltage side of DAB and C is the equivalent capacitance of the outlet capacitor. Outlet capacitor voltage is $u_{dc}$. L represents the equivalent value of outlet reactor inductance and R denotes the series resistance and contact resistance in the discharge circuit. As shown in FIG. 4, the process of energy flow is that the photovoltaic source (constant current source) will charge the capacitor $C_{PV}$ (Path ①), and the capacitor $C_{PV}$ will not only charge the outlet capacitor C, but also provides current to the fault point through the DAB. At the same time, there are two working states when the DAB enters a new steady state. In FIG. 4, blue arrows represent one current path including connectivity of $C_{PV}$, $g_{11}$, $g_{11}'$ and C. The other path is shown as red arrows, which includes connectivity of $C_{PV}$, $g_{12}$, $g_{12}'$ and C. The outlet capacitor C of the DAB forms a fault loop circuit (Path ②) with the outlet reactor and the fault point.

In conclusion, the fault current $i_{dc}$ includes both the photovoltaic current and the discharge current of the DAB outlet capacitor in a new steady state.

Assuming that there is no other sources in fault loop circuit (Path ① and Path ②), the capacitor C will continue to discharge at the fault point until the fault current reduces to zero. In fact, the photovoltaic source is always in the fault loop circuit. Hence, the majority of the fault current is directly provided by the photovoltaic source and the current provided by the photovoltaic source is larger than the discharge current of the DAB outlet capacitor when entering the new steady state. Therefore, the photovoltaic source and the DAB can be regarded as a harmonic injection source. In other words, the level of injecting DC is determined by the photovoltaic source, and the current is uncontrolled. Especially, the injected DC with the harmonics cannot be described in a clear formula after the DC distribution system enters the transient stabilization state due to that the fault circuit and photovoltaic output are both uncertain. But the results of this protection method and system disclosed herein are not affected as long as the current exists when the DC distribution system enters the transient stabilization state. Therefore, the equivalent circuit 400 of FIG. 4 can be simplified as the equivalent circuit 500 of FIG. 5.

Figure 5:
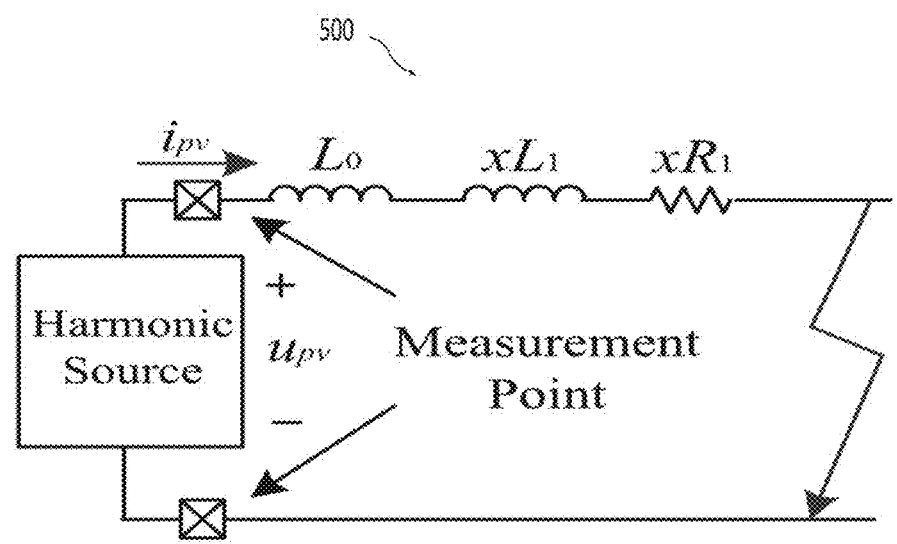
FIG. 5 shows an example schematic diagram of protection measurement according to an embodiment of the present disclosure.

As shown in FIG. 5, $u_{pv}$ and $i_{pv}$ are the pole-to-pole voltage and current at the measurement point. $L_0$ is the DC current limiting reactor equivalent inductance, $R_1$ and $L_1$ are the resistance and inductance per kilometer of DC cables, respectively, and x represents the distance from the fault point to the measurement point. According to the equivalent circuit 500, the measured DC-side voltage can be represented as:

$$u_{pv} = xR_1 i_{pv}(t) + (xL_1 + L_0)\frac{di_{pv}(t)}{dt} \quad (2)$$

Fourier transform is used to extract the harmonic components of the voltage and current:

$$U_{pv}^y = xR_1 I_{pv}^y + jy2\pi f(xL_1 + L_0)I_{pv}^y \quad (3)$$

where y represents the number of harmonics, f is the frequency (DAB switching frequency), and $U_{pv}^y$ and $I_{pv}^y$ are the harmonic phasors of the measured voltage and current, respectively. Measured impedance can be obtained by:

$$Z_{pv}^y = \frac{U_{pv}^y}{I_{pv}^y} = x(R_1 + jy2\pi fL_1) + jy2\pi fL_0 \quad (4)$$

The fault distance x can be calculated using the harmonic reactance:

$$x = \frac{Z_{pv}^y - jy2\pi fL_0}{R_1 + jy2\pi fL_1} \quad (5)$$

Accurately extracting the harmonic component from measurements is a vital component of the proposed fault location method disclosed herein. Therefore, in order to rapidly locate faults, the windowed Fourier algorithm is used (about one cycle of custom frequency).

B. Protection Scheme of Flexible DC Distribution System with Multi-Terminal Distributed Photovoltaic Sources The fault area can be roughly determined by calculating the harmonic impedance, but it will be influenced by measurement errors and cannot precisely cover the whole line without using coordination. Therefore, in order to solve the selectivity problem of single-end protection, this disclosure utilizes the inter-station communication of the converter to unlock different DABs with alternate injection frequencies. At this point, there are two injection sources with different frequencies in the DC distribution system, achieving the selectivity of the protection.

Figure 6:
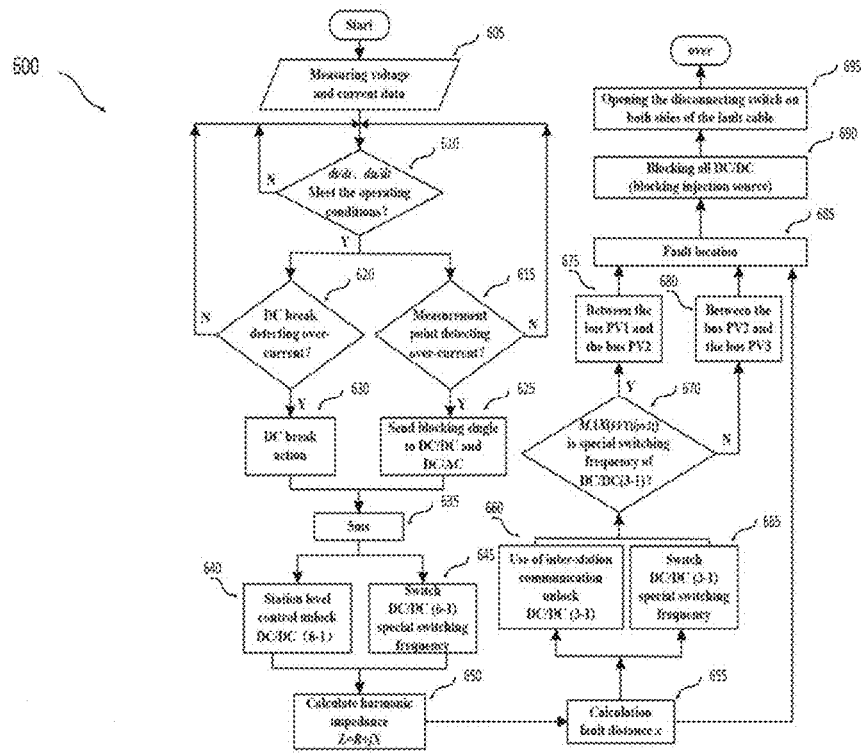
FIG. 6 shows a flow chart of an example protection method according to an embodiment of the present disclosure.

Take the F2 fault in FIG. 1 as an example. A flow chart of a method 600 of fault detection and location is shown in FIG. 6.

The di/dt and du/dt are used as the starting criteria of the method 600 to detect if there is an unusual DC distribution system operation and to start the protection (blocks 605 and 610).

After the protection is started, the current of each measuring point (including the measuring point in the DC circuit breaker) is used to estimate whether it is overcurrent (blocks 615 and 620). If the line current is greater than the setting value, the blocking signal is sent to the local converter (DC/DC, DC/AC) (block 625). Meanwhile, the DC breaker starts to operate (block 630).

The ring system is loop-opening after 7 ms as the operation time of the DC breaker is about 5 ms (block 635). Then, the DC/DC (6-1) is unlocked using the station level control (block 640), and the switching frequency is switched to output the harmonic component of the characteristic frequency (block 645).

The harmonic component of the characteristic frequency output by DC/DC (6-1) is extracted by a windowed fast Fourier transform (FFT). The harmonic impedance value is thus calculated (block 650), and the fault distance x is roughly determined (block 655).

The calculation of harmonic impedance using only the single-end data cannot distinguish between the fault near end of the cable and the fault near the start of the next cable section. For example, fault point F2 and F3 are on both sides of measurement point 2 and their electrical distance is very short, as shown in FIG. 1. Therefore, inter-station communication is used to let DC/DC (6-1) send unlocked signals to DC/DC (3-1) (block 660) and change their switching frequencies to output the harmonic components of the characteristic frequency different from DC/DC (6-1) (block 665).

The maximum frequency component among the values that are extracted is acquired from the current data of the measuring point 2 by FFT to determine whether it is provided by the specific frequency of DC/DC (6-1) (block 670). If it is, the fault point is at the start of the next cable (block 675). If it is not, the fault point is considered to be at the end of the upper cable (block 680).

In a combination of blocks 635-645 and blocks 670-680, the fault location is finally determined and all the converters in the DC distribution system will be blocked again (block 690). The isolation switches on both sides of the corresponding fault cable will be opened and the DC distribution system commences restoration (block 695).

In summary, the maximum time from the protection starting to protection reset is 23 ms. This time includes 3 ms time of the overcurrent detection and relay protection signal communication, 5 ms operation time of the DC circuit breaker, 5 ms initial locating time of the fault area (the window time for calculating the impedance for the first time), 5 ms locating time of the fault area (the window time for calculating the maximum frequency component), 1 ms total time of converter-to-converter communication and converter control switching, and 3 ms isolation switch operation time. Meanwhile, there may be more delay time about 1 ms in the real hardware system, such as some stray time of data packing and logic signal communication.

C. Influence of the Cable-Distributed Capacitance

Cable distributed capacitance and cable distributed inductance are the basis of the traveling wave. Therefore, the frequency of the distributive current of capacitance and inductance is consistent with the natural frequency of the traveling wave. The natural frequencies of traveling waves are related to fault distance and boundary conditions. The mathematical relationship is:

$$f_S = \frac{(\theta_S + \theta_F + 2k\pi)v}{4\pi d}, k = 0, \pm 1, \pm 2K \tag{6}$$

where v is traveling wave velocity, d is the fault distance, $\theta_S$ is the reflection coefficient angle at the beginning of the line, and $\theta_F$ is the reflection coefficient angle at the fault point. The numeric area of $\theta_S$ (the reflection coefficient angle at the beginning of the line) is 0 to $\pi$. For both a metal fault and transitional resistance fault reflection, the coefficient angle $\theta_F$ at the fault point is 0. Therefore, the theoretical minimum value of the natural frequency of the traveling wave $$f_{smin} = \frac{v}{4d} \tag{7}$$

For the high frequency component of the traveling wave, the wave velocity v is about 97%~99% of the light speed. Considering that the transmission distance of the ±10 kV DC distribution system is generally within about 40 km (d will not exceed 40 km), $f_{smin}$ can calculate that the main frequency of the natural frequency will be no less than 1800 Hz.

In summary, the frequency of the injection source is 200 Hz or 300 Hz for the method disclosed in this disclosure. Compared to the distributive capacitance current frequency and the distributive inductance current frequency, this number is within the low frequency range. Therefore, in theory, the cable distributed capacitance and cable distributed inductance will not affect the action performance of the method disclosed herein.

IV. HARDWARE TESTING AND SIMULATION

The foundation of the disclosed protection method and system which involve switching the DAB output frequency is verified by a scaled-down hardware testing system. This testing mainly focuses on whether the DAB can change the switching frequency, which can cause a change in the DAB output frequency. The full performance of the disclosed method is further tested in a hardware simulation with complicated configurations.

A. Experiment Verification

Figure 7:
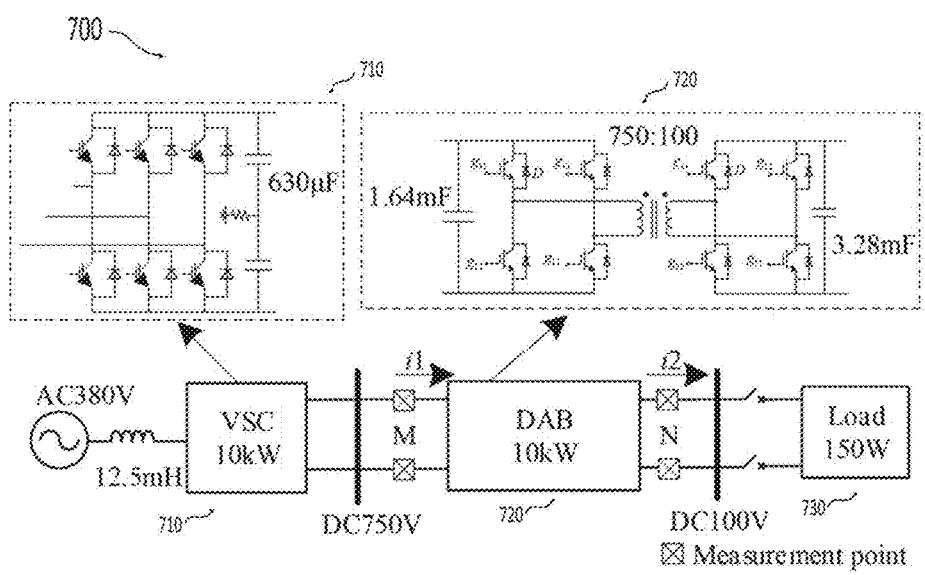
FIG. 7 shows an example topology of voltage-source converter (VSC)-DC system with DAB according to an embodiment of the present disclosure.

In order to verify the theoretical analysis above and comprehensively evaluate the performance of the disclosed method, a simple 750V DC experimental platform 700 with DAB is built as depicted in FIG. 7 in which a schematic diagram of the experimental platform 700 is illustrated. The hardware testing system/experimental platform 700 can comprise a VSC 710, a DAB 720, and a passive load 730.

Figure 8:
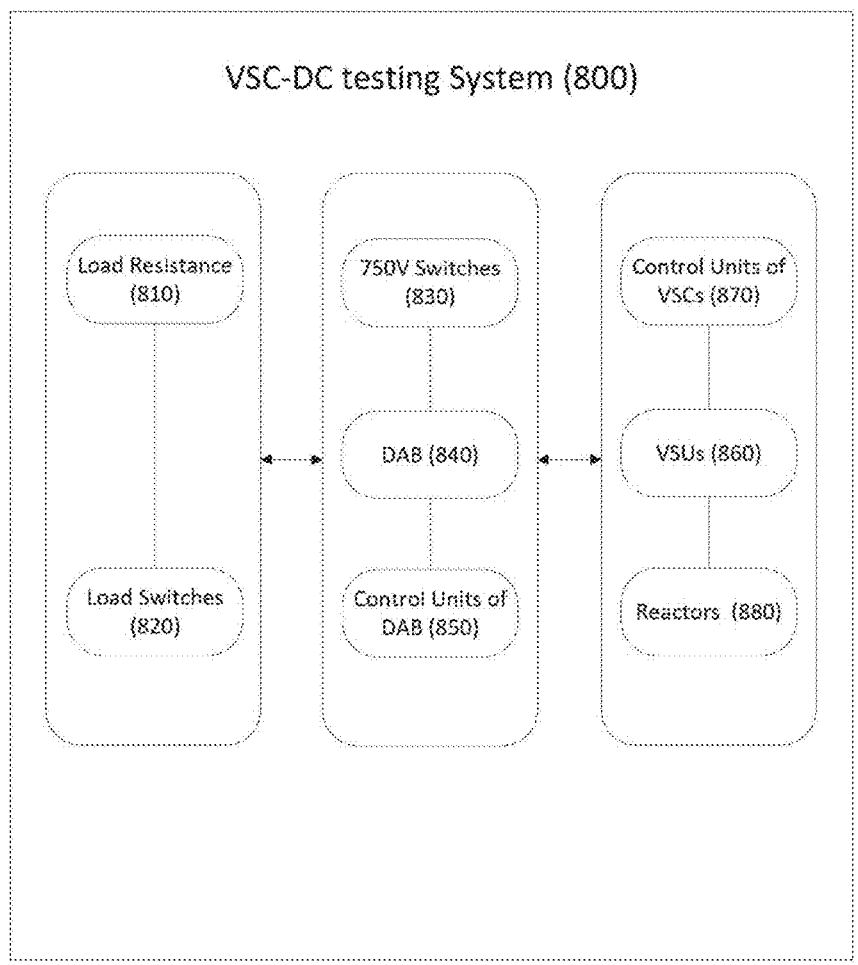
FIG. 8 shows a schematic diagram of an example scaled-down hardware test bed of VSC-DC system with DAB according to an embodiment of the present disclosure.

The VSC 710 can provide constant DC voltage control. The whole test bed is placed in three cabinets, as illustrated in FIG. 8 in which an example scaled-down hardware testing bed 800 is illustrated to implement the experimental platform 700. The example scaled-down hardware testing bed 800 may comprise a load resistance 810, one or more load switches 820, one or more 750V switches 830, a DAB 840, control units of DAB 850, VSCs 860, control units of VSCs 870, and reactors 880. The rated capacity of the VSC is 10 kW, the phase-to-phase capacitance is 1260 µF, and the AC-side reactor is 12.5 mH. Additionally, the rated capacity of the DAB is 10 kW and the ratio of transformation is 760:100. The high voltage side capacitance is 1.64 mF and the low voltage side capacitance is 3.28 mF. The DAB can utilize a phase-shifting modulation with square wave and a demonstration of the DAB output variable frequencies is provided in FIG. 9 in which an example DC current waveform 900 after changing switching frequency of the DAB is illustrated.

Figure 9:
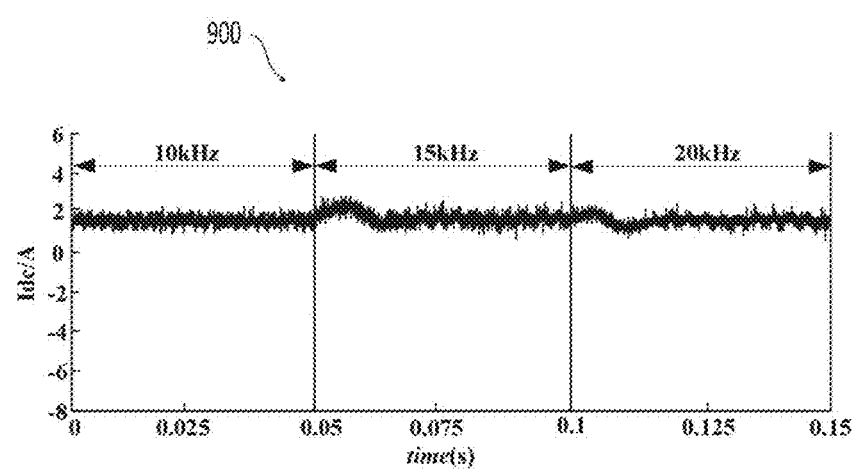
FIG. 9 shows an example DC current waveform after changing the switching frequency of DAB according to an embodiment of the present disclosure.

The DC current waveform is measured at the measurement point of N in FIG. 7. Changing of the DAB switching frequency is shown in FIG. 9. As shown in FIG. 9, the switching frequency is 10 k Hz before 0.05 s, then the switching frequency is changed to 15 kHz at 0.05 s. After another 0.05 s, the switching frequency is switched to 20 kHz. It can be seen from FIG. 9 that the amplitude and frequency of the output DC current waveform vary during the changing of switching frequency. To verify the correlation between the output current frequency and the switching frequency, the current waveform is extracted and analyzed by the FFT, and the results are provided in FIG. 10. Apparently, the amplitude of characteristic frequency is independent under the different control objectives due to that the characteristic frequency amplitude is uncontrolled. Hence, the amplitude of characteristic frequency is different under the different control objectives.

Figure 10:
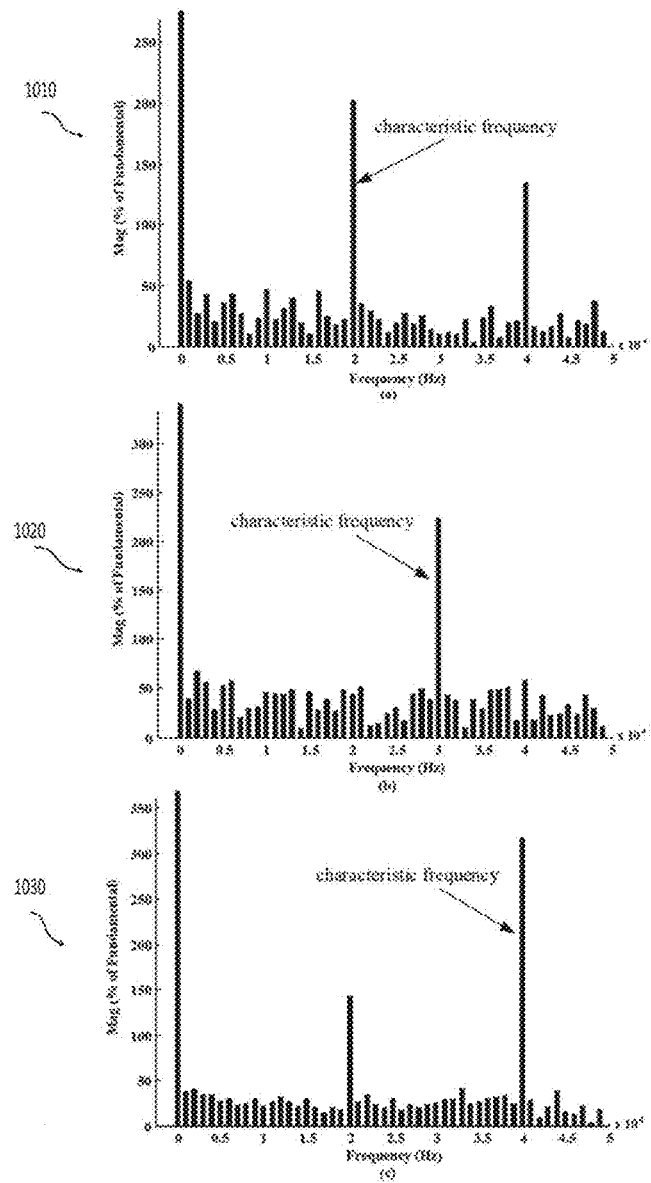
FIG. 10 shows example analysis results of current waveform using fast Fourier transform (FFT) according to an embodiment of the present disclosure.

The data before 0.05 s in FIG. 9 is converted into the frequency domain and the result is shown in the diagram 1010 in FIG. 10. In addition to the DC component, the content of 20 kHz is the largest, which is consistent with the switching double-frequency of DAB. The 10 kHz value is far less than the content of 20 kHz due to the inverse proportion of the harmonic amplitude to the frequency. The diagram 1020 in FIG. 10 shows the FFT analysis of the current data (provided in FIG. 9) from 0.05 s to 0.1 s. It can be seen that the component 30 kHz provides the largest value (except for the DC component). The frequency domain analysis of data after 0.1 s in FIG. 9 is illustrated in the diagram 1030 in FIG. 10, in which the largest frequency content is 40 kHz, which is consistent with the switching double-frequency of DAB. These findings illustrate that apart from the DC component, the output current waveform mainly contains the DAB switch double-frequency. Therefore, a change of the switching frequency will cause a change in the DAB output frequency.

Although, it is difficult to reduce the switching frequency to 100 Hz and 150 Hz for DC/DC transformer in experiment and engineering, it may be realized in the future with the rapid development of new materials technology. Expressly, a new research idea (detection and location method-based active protection) for flexible DC distribution systems will bring good performances of the protection and increase the system security.

A. Simulation Verification and Analysis

To comprehensively verify the theoretical analysis and evaluate the performance of the disclosed method, a ±10 kV flexible DC distribution system with multi-terminal distributed photovoltaic sources is built in the simulation tool PSCAD®/EMTDC®, based on the topology in FIG. 1. PSCAD®/EMTDC® is a power system simulation software for the design, analysis, optimization, and verification of various types of power systems.

Based on this topology and the fault point of F2, the theoretical value Z of the equivalent impedance is calculated at the measuring point of the PV6 converter output. The data sampling frequency is 10 kHz, and the protection operation is carried out as outlined in FIG. 6.

Figure 11:
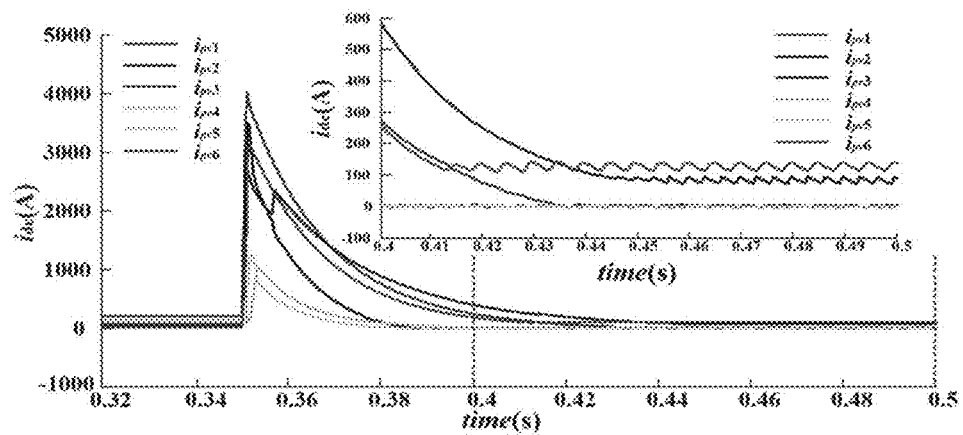
FIG. 11 shows an example simulation of DC current waveform under F2 fault according to an embodiment of the present disclosure.
Figure 12:
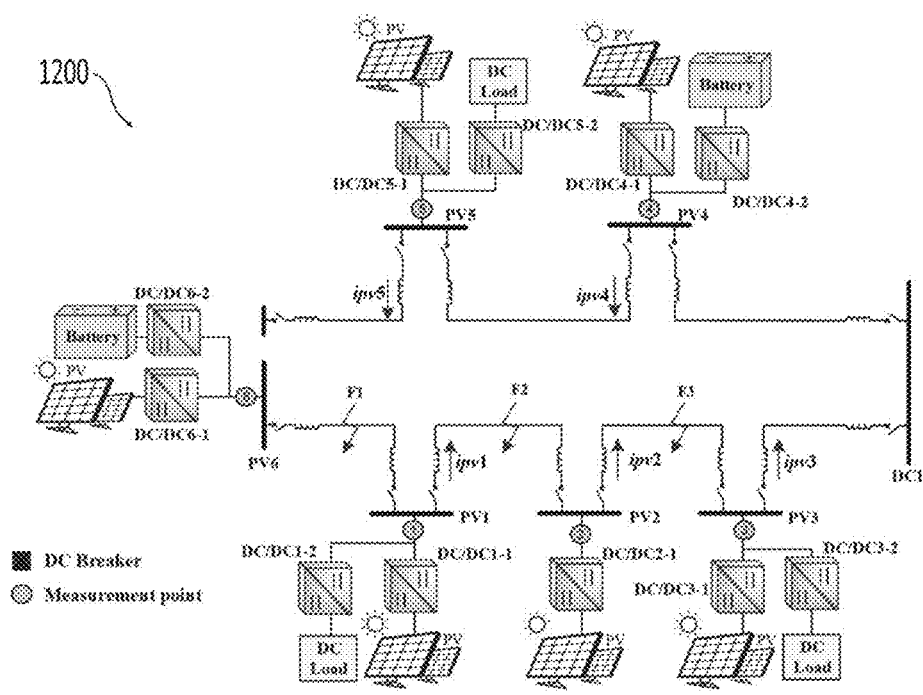
FIG. 12 shows a structure diagram of an example system equivalent to the system in FIG. 1 according to an embodiment of the present disclosure.

The simulated current waveforms seen from the six different DC/DC converter output measurement points during the F2 fault are provided in FIG. 11. It can be observed that the fault occurs at 0.35 s. After the fault, the currents measured at the six photovoltaic terminals rise rapidly and meet both operation thresholds of converter self-protection (blocking the converters) and the DC circuit breaker. The ring system is loop-opening by the DC circuit breaker after approximately 7 ms. Under this circumstance, the system diagram 100 of FIG. 1 is equivalent to the system diagram 1200 of FIG. 12. Meanwhile, the station level controls unlock the DC/DC converter (6-1) and change the switching frequency (for example, to 100 Hz). It can be seen that the DC distribution system enters a steady state after the fault, as shown in FIG. 11. Meanwhile, current $i_{pv}6$ fluctuates with the frequency of 200 Hz. In other words, the DC/DC converter (6-1) can be regarded as a harmonic injection source and the circuit diagram can be simplified as the diagram 500 of FIG. 5. Therefore, by calculating the harmonic impedance, the fault area is preliminarily determined to be about 3 km from the measurement point (Reference formula (2)-(5) in Section III above).

Figure 13:
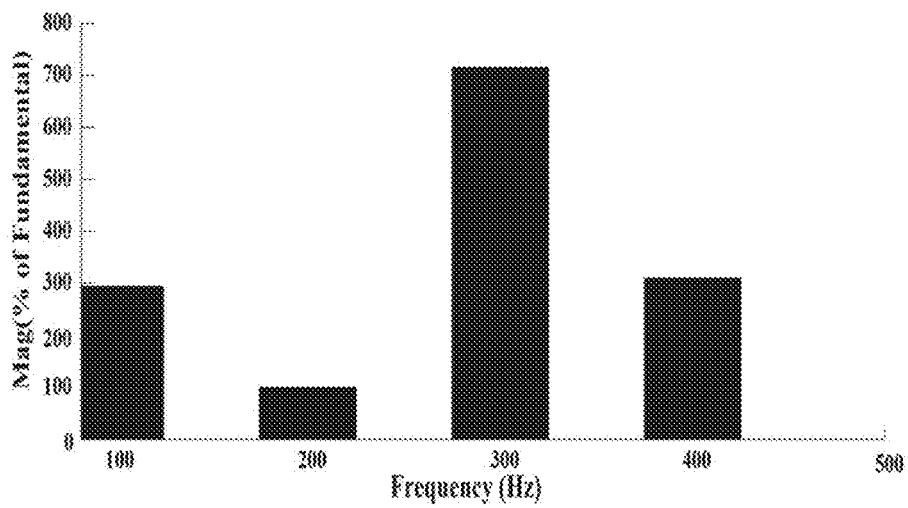
FIG. 13 shows a FFT analysis result of an example measurement point according to an embodiment of the present disclosure.

In order to distinguish between the fault at the end of the cable (fault point F2 in FIG. 12, which may be referred to as a first fault point) and the fault at the start of the next cable (fault point F3 in FIG. 12, which may be referred to as a second fault point), after the fault area is preliminarily determined, the DC/DC (6-1) control system transmits the unlocking signal to DC/DC (3-1) and changes its switching frequency to 150 Hz. This explains the fluctuation of 300 Hz existing in $i_{pv}3$, shown in FIG. 11. The current data derived from the measurement point 2 is used to calculate maximum frequency component by FFT with 100 Hz fundamental frequency. The largest content is 300 Hz (the characteristic frequency of DC/DC (3-1)), which is shown in FIG. 13. This proves that there is no fault between measuring point 2 and measuring point 3, as the injected characteristic frequency signal (300 Hz) is not bypassed by the fault point.

The performance of the disclosed method evaluated under the different factors (fault distance, noise, cable-distributed capacitance, and fault resistance) is illustrated in Table 3 and Table 4, in which E represents the error of estimated fault distance. As seen in Table 4, pole-to-pole faults at different distances are simulated to test the performance of the disclosed method. The results indicate that the protection can operate correctly for all faults in the proposed line, regardless of the fault distance. Additionally, to verify the disclosed method with regard to measurement noise, 40 dB Gaussian noise is superimposed on measurements of each testing. By comparison, the error of estimated fault distance under 40 dB noise illustrates that the result is slightly influenced, but the fault area can be determined and the error is still less than 2% under 40 dB noise. It is known that noise may affect the current waveform, but noise would seldom affect the main harmonic components in the current waveform. The main theoretical reason for this is that the random noise would not inundate the frequency of the special signal injection source.

To analyze the influences of distributive capacitances and distributive inductances of the DC line, parameters of twice and four times the original value are set, respectively. As shown in Table 3, the calculation results illustrate that the disclosed protection method can still distinguish the correct faulted area with different distances and line capacitances. The relative error in all cases is within 2%, and the result is stable. This is because the frequency of the injection source is 200 Hz or 300 Hz for the method disclosed in this disclosure, which is a much lower frequency than the frequency of the distributive capacitance current and the distributive inductance current. Therefore, the cable distributed capacitance and the cable distributed inductance would not affect the action performance of the disclosed method. Simulation results also verify the accuracy of the theoretical analysis described above.

resistance. Thus, the protection disclosed herein can correctly identify the fault area and meet the sensitivity requirements.

A new detection and location method-based active protection for flexible DC distribution systems with multi-terminal distributed photovoltaic sources is disclosed in this disclosure. The disclosed protection method can identify the correct faulted area by calculating harmonic impedance of characteristic signals. Hardware testing and computational simulation results illustrate that the disclosed method is effective for achieving a combination of control and protection through the controllability of power electronics. Compared with the existing DC protection methods, this disclosed technique does not require additional injection equipment and modification of the DC distribution system configuration, nor does it need high data sampling frequency. The disclosed technique is also unaffected by measuring noise and cable-distributed capacitance. This new

TABLE 3

SIMULATION RESULTS OF THE DISCLOSED METHOD

| | Cable distributed capacitance | | | | | | Cable distributed inductance | | | | | |
|---|---|---|---|---|---|---|---|---|---|---|---|---|
| Fault Point/ km | 0.0073 uF/ km | E/% | 0.0194 uF/ km | E/% | 0.0292 uF/ km | E/% | 0.3 mH/ km | E/% | 0.6 mH/ km | E/% | 1.2 mH/ km | E/% |
| 1 | 0.986 | 1.40 | 0.986 | 1.40 | 0.985 | 1.50 | 0.986 | 1.40 | 1.011 | 1.10 | 0.982 | 1.80 |
| 2 | 2.031 | 1.55 | 2.029 | 1.45 | 2.028 | 1.40 | 2.031 | 1.55 | 1.974 | 1.30 | 1.974 | 1.30 |
| 3 | 3.047 | 1.56 | 3.045 | 1.50 | 3.047 | 1.56 | 3.047 | 1.56 | 3.052 | 1.73 | 2.977 | 1.15 |
| 4 | 4.061 | 1.52 | 4.063 | 1.57 | 4.063 | 1.57 | 4.061 | 1.52 | 4.066 | 1.65 | 3.951 | 1.22 |
| 5 | 5.075 | 1.50 | 5.075 | 1.50 | 5.073 | 1.46 | 5.075 | 1.50 | 4.911 | 1.78 | 5.073 | 1.46 |
| 6 | 6.091 | 1.51 | 6.089 | 1.48 | 6.092 | 1.53 | 6.091 | 1.51 | 6.109 | 1.81 | 5.905 | 1.58 |
| 7 | 7.115 | 1.64 | 7.116 | 1.65 | 7.107 | 1.52 | 7.115 | 1.64 | 6.893 | 1.52 | 7.107 | 1.52 |
| 8 | 7.889 | 1.38 | 7.874 | 1.57 | 7.886 | 1.42 | 7.889 | 1.38 | 8.134 | 1.67 | 8.155 | 1.93 |
| 9 | 8.872 | 1.42 | 8.868 | 1.46 | 8.865 | 1.50 | 8.872 | 1.42 | 9.153 | 1.70 | 9.171 | 1.90 |
| 10 | 9.853 | 1.47 | 9.856 | 1.44 | 9.847 | 1.53 | 9.853 | 1.47 | 9.875 | 1.25 | 9.840 | 1.63 |

TABLE 4

SIMULATION RESULTS OF THE DISCLOSED METHOD

| | | | | | Cable-distributed capacitance | | | | | | | |
|---|---|---|---|---|---|---|---|---|---|---|---|---|
| Fault Point/ km | Noise | | | | 0.0073 uF/ km | | 0.0146 uF/ km | | 0.0292 uF/ km | | Fault resistance | |
| | 0 dB | E/% | 40 dB | E/% | km | E/% | km | E/% | km | E/% | 5Ω | E/% |
| 1 | 0.986 | 1.40 | 1.011 | 1.10 | 0.986 | 1.40 | 0.986 | 1.40 | 0.985 | 1.50 | 1.011 | 1.10 |
| 2 | 2.031 | 1.55 | 1.974 | 1.30 | 2.031 | 1.55 | 2.029 | 1.45 | 2.028 | 1.40 | 1.974 | 1.30 |
| 3 | 3.047 | 1.56 | 3.052 | 1.73 | 3.047 | 1.56 | 3.045 | 1.50 | 3.047 | 1.56 | 3.047 | 1.56 |
| 4 | 4.061 | 1.52 | 4.066 | 1.65 | 4.061 | 1.52 | 4.063 | 1.57 | 4.063 | 1.57 | 4.061 | 1.52 |
| 5 | 5.075 | 1.50 | 4.911 | 1.78 | 5.075 | 1.50 | 5.075 | 1.50 | 5.073 | 1.46 | 5.075 | 1.50 |
| 6 | 6.091 | 1.51 | 6.109 | 1.81 | 6.091 | 1.51 | 6.089 | 1.48 | 6.092 | 1.53 | 6.089 | 1.48 |
| 7 | 7.115 | 1.64 | 6.893 | 1.52 | 7.115 | 1.64 | 7.116 | 1.65 | 7.107 | 1.52 | 7.115 | 1.64 |
| 8 | 7.889 | 1.38 | 8.134 | 1.67 | 7.889 | 1.38 | 7.874 | 1.57 | 7.886 | 1.42 | 7.889 | 1.38 |
| 9 | 8.872 | 1.42 | 9.153 | 1.70 | 8.872 | 4.42 | 8.868 | 1.46 | 8.865 | 1.50 | 8.872 | 4.42 |
| 10 | 9.853 | 1.47 | 9.875 | 1.25 | 9.853 | 1.47 | 9.856 | 1.44 | 9.847 | 1.53 | 9.875 | 1.25 |

As shown in Table 4, pole-to-pole faults in DC cables are commonly caused by external damage and most are solid faults. It is therefore sufficient to set a 5Ω resistor, which is equivalent to hundreds of kilometers of cable, due to low cable resistance per kilometer. However, the length of cable in a distribution system would almost never exceed 100 km. As shown in Table 3, the fault area can be detected and the error is still less than 2% under the highest considered fault protection is therefore feasible for industry application in a large and complex DC network.

V. TECHNICAL IMPLEMENTATION OF THE DISCLOSED METHOD

Figure 14:
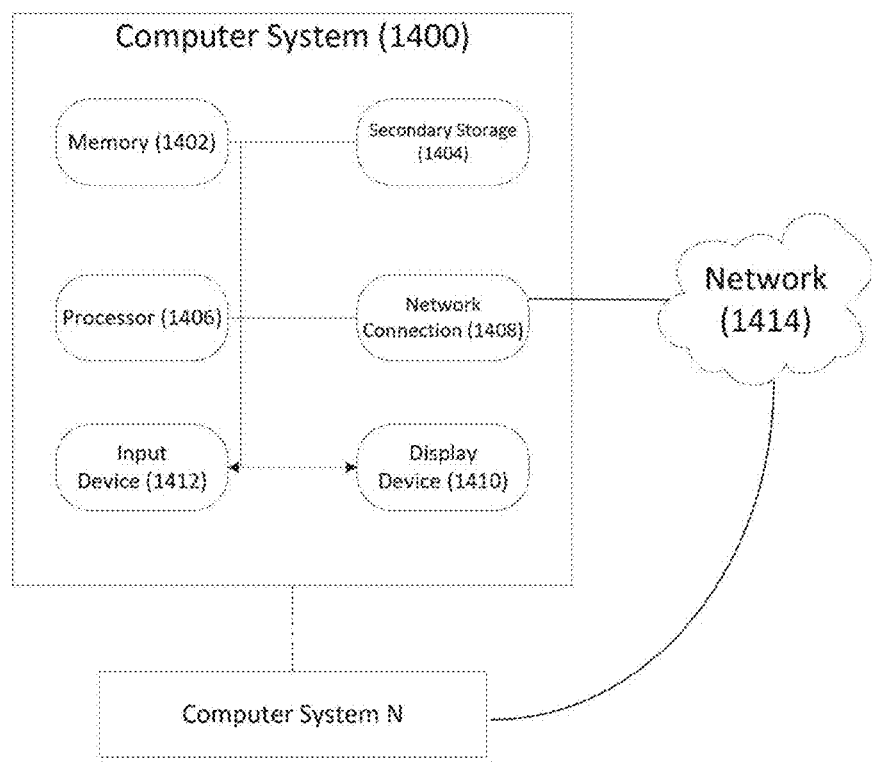
FIG. 14 shows an exemplary computer system according to an embodiment of the present disclosure.

In some embodiments, the protection system disclosed herein may comprise a computer system to implement the disclosed protection method. The computer system may act as a controller to control executions of, for example, the flow chart of the protection method 600 in FIG. 6, the DC/DC converter output current waveform measurements shown in FIG. 9, the FIT analysis shown in FIG. 10, the simulations of DC current waveform shown in FIG. 11, and the FTT analysis shown in FIG. 13. FIG. 14 illustrates an exemplary computer system 1400 that can be used to implement the disclosed method partially or wholly. The computer system 1400, or other computer systems similarly configured, may include and execute one or more subsystem components to perform functions described herein, including the steps/blocks of various flow processes, measurements and/or analyses described above. Likewise, a mobile device, a cell phone, a smartphone, a laptop, a desktop, a notebook, a tablet, a wearable device, a server, etc., which includes some of the same components of the computer system 1400, may run an application (or software) and perform the steps and functionalities described above. The computer system 1400 may connect to a network 1414, e.g., Internet, or other network, to receive inquiries, obtain data, and/or transmit information as described above.

The computer system 1400 typically includes a memory 1402, a secondary storage device 1404, and a processor 1406. The computer system 1400 may also include a plurality of processors 1406 and be configured as a plurality of, e.g., bladed servers, or other known server configurations. The computer system 1400 may also include a network connection device 1408, a display device 1410, and an input device 1412.

The memory 1402 may include RAM or similar types of memory, and it may store one or more applications for execution by the processor 1406. The secondary storage device 1404 may include a hard disk drive, floppy disk drive, CD-ROM drive, or other types of non-volatile data storage. The processor 1406 executes the application(s), such as those described herein, which are stored in the memory 1402 or secondary storage 1404, or received from the Internet or other network 1414. The processing by processor 1406 may be implemented in software, such as software modules, for execution by computers or other machines. These applications preferably include instructions executable to perform the system and subsystem component functions and methods described above and illustrated in the Figs. herein. The applications preferably provide graphical user interfaces (GUIs) through which users may view and interact with the subsystem components.

The computer system 1400 may store one or more database structures in the secondary storage 1404, for example, for storing and maintaining the information/data necessary to perform the above-described functions. Alternatively, such information/data may be in storage devices separate from these components.

Also, as noted, the processor 1406 may execute one or more software applications to provide the functions described in this specification, specifically to execute and perform the steps and functions in the process flows, measurements and/or analyses described above. The GUIs may be formatted, for example, as web pages in HyperText Markup Language (HTML), Extensible Markup Language (XML) or in any other suitable form for presentation on a display device depending upon applications used by users to interact with the computer system 1400.

The input device 1412 may include any device for entering information into the computer system 1400, such as a touch-screen, keyboard, mouse, cursor-control device, microphone, digital camera, video recorder or camcorder.

The input and output device 1412 may be used to enter information into GUIs during performance of the methods described above. The display device 1410 may include any type of device for presenting visual information such as, for example, a computer monitor or flat-screen display (or mobile device screen). The display device 1410 may display the GUIs and/or output from sub-system components (or software).

Examples of the computer system 1400 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 1400 is shown in detail, the computer system 1400 may use multiple computer systems or servers as necessary or desired to support the users and may also use back-up or redundant servers to prevent network downtime in the event of a failure of a particular server. In addition, although the computer system 1400 is depicted with various components, one skilled in the art will appreciate that the computer system 1400 can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 1400, to perform a particular method, such as methods described above.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example." "an example," "various examples." "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A fault detection and location-based active protection system for a flexible direct current (DC) distribution power system with multiple photovoltaic (PV) terminals, wherein the flexible DC distribution power system with multiple photovoltaic (PV) terminals comprises:

a plurality of DC/DC converters, each DC/DC converter configured to connect one of the multiple PV terminals to the flexible DC distribution power system, and the plurality of DC/DC converters configured to be in signal communication with one another throughout the flexible DC distribution power system;

a DC/alternating current (AC) converter configured to connect the flexible DC distribution power system to an AC power grid to allow bidirectional power flow between the AC power grid and the flexible DC distribution power system;

a first DC circuit breaker positioned on a DC cable connecting one of the plurality of DC/DC converters to the flexible DC distribution power system; and a second DC circuit breaker positioned on a DC cable connecting the flexible DC distribution power system to the DC/AC converter, the fault detection and location-based active protection system comprising a controller in signal communication with the flexible DC distribution power system, the controller configured to:

monitor and measure an output current value of each DC/DC converter at a measurement point located between the DC/DC converter and its corresponding DC cable connecting to the flexible DC distribution power system, a current value of the first DC circuit breaker, and a current value of the second DC circuit breaker;

determine whether the output current value is greater than a self-protection current threshold of a corresponding DC/DC converter, whether the current value of the first DC circuit breaker is greater than a current threshold of the first DC circuit breaker, and whether the current value of the second DC circuit breaker is greater than a current threshold of the second DC breaker;

in response to detecting at least one selected from the group of: the output current value is greater than the self-protection current threshold of the corresponding DC/DC converter, the current value of the first DC circuit breaker is greater than the current threshold of the first DC circuit breaker, and the current value of the second DC circuit breaker is greater than the current threshold of the second DC breaker, transmit a blocking signal to the plurality of DC/DC converters and the DC/AC converter to block the plurality of DC/DC converters and the DC/AC converter, and to disconnect the first and second DC circuit breakers;

transmit an unblocking signal to a first DC/DC converter of the plurality of DC/DC converters to unblock the first DC/DC converter;

change a switching frequency of the first DC/DC converter to cause the first DC/DC converter to produce a first harmonic output current waveform comprising a first characteristic frequency corresponding to the switching frequency of the first DC/DC converter;

measure the first harmonic output current waveform at the measurement point located between the first DC/DC converter and its corresponding DC cable connecting to the flexible DC distribution power system;

apply fast Fourier transform (FFT) to the first harmonic output current waveform to extract from the first harmonic output current waveform a harmonic voltage value and a harmonic current value corresponding to the first characteristic frequency;

determine, based on the harmonic voltage value and the harmonic current value, a harmonic impedance value between the measurement point of the first DC/DC converter and a fault point;

determine, based on the harmonic impedance, a fault distance between the measurement point of the first DC/DC converter and the fault point;

cause the first DC/DC converter to transmit the unblocking signal to a second DC/DC converter of the plurality of DC/DC converter to unblock the second DC/DC converter, wherein the second DC/DC converter is selected such that the fault point is located between the first DC/DC converter and the second DC/DC converter;

change a switching frequency of the second DC/DC converter to cause the second DC/DC converter to produce a second harmonic output current waveform comprising a second characteristic frequency corresponding to the switching frequency of the second DC/DC converter, wherein the second characteristic frequency is different than the first characteristic frequency;

measure an output current waveform at a measurement point located between the first DC/DC converter and the second DC/DC converter;

apply the FFT to the output current waveform to extract from the output current waveform a maximum frequency;

determine whether the maximum frequency is equal to the second characteristic frequency;

in response to that the maximum frequency is equal to the second characteristic frequency, locate the fault point to be between the first DC/DC converter and the measurement point at which the output current waveform is measured;

in response to that the maximum frequency is not equal to the second characteristic frequency, locate the fault point to be between the second DC/DC converter and the measurement point at which the output current waveform is measured;

block the first and second DC/DC converters; and restore the flexible DC distribution power system.

2. A fault detection and location-based active protection method for a flexible direct current (DC) distribution power system with multiple photovoltaic (PV) terminals, wherein the flexible DC distribution power system comprises:

a plurality of DC/DC converters, each DC/DC converter configured to connect one of the multiple PV terminals to the flexible DC distribution power system, and the plurality of DC/DC converters configured to be in signal communication with one another throughout the flexible DC distribution power system;

a DC/alternating current (AC) converter configured to connect the flexible DC distribution power system to an AC power grid to allow bidirectional power flow between the AC power grid and the flexible DC distribution power system;

a first DC circuit breaker positioned on a DC cable connecting one of the plurality of DC/DC converters to the flexible DC distribution power system;

a second DC circuit breaker positioned on a DC cable connecting the flexible DC distribution power system to the DC/AC converter; and a controller in signal communication with the flexible DC distribution power system, the method comprising:

monitoring and measuring, by the controller, an output current value of each DC/DC converter at a measurement point located between the DC/DC converter and its corresponding DC cable connecting to the flexible DC distribution power system, a current value of the first DC circuit breaker, and a current value of the second DC circuit breaker;

determining, by the controller, whether the output current value is greater than a self-protection current threshold of a corresponding DC/DC converter, whether the current value of the first DC circuit breaker is greater than a current threshold of the first DC circuit breaker, and whether the current value of the second DC circuit breaker is greater than a current threshold of the second DC breaker;

in response to detecting at least one selected from the group of: the output current value is greater than the self-protection current threshold of the corresponding DC/DC converter, the current value of the first DC circuit breaker is greater than the current threshold of the first DC circuit breaker, and the current value of the second DC circuit breaker is greater than the current threshold of the second DC breaker, transmitting, by the controller, a blocking signal to the plurality of DC/DC converters and the DC/AC converter to block the plurality of DC/DC converters and the DC/AC converter, and to disconnect the first and second DC circuit breakers;

transmitting, by the controller, an unblocking signal to a first DC/DC converter of the plurality of DC/DC converters to unblock the first DC/DC converter;

changing, by the controller, a switching frequency of the first DC/DC converter to cause the first DC/DC converter to produce a first harmonic output current waveform comprising a first characteristic frequency corresponding to the switching frequency of the first DC/DC converter;

measuring, by the controller, the first harmonic output current waveform at the measurement point located between the first DC/DC converter and its corresponding DC cable connecting to the flexible DC distribution power system;

applying, by the controller, fast Fourier transform (FFT) to the first harmonic output current waveform to extract from the first harmonic output current waveform a harmonic voltage value and a harmonic current value corresponding to the first characteristic frequency;

determining, by the controller based on the harmonic voltage value and the harmonic current value, a harmonic impedance value between the measurement point of the first DC/DC converter and a fault point;

determining, by the controller, based on the harmonic impedance, a fault distance between the measurement point of the first DC/DC converter and the fault point;

cause, by the controller, the first DC/DC converter to transmit the unblocking signal to a second DC/DC converter of the plurality of DC/DC converter to unblock the second DC/DC converter, wherein the second DC/DC converter is selected such that the fault point is located between the first DC/DC converter and the second DC/DC converter;

changing, by the controller, a switching frequency of the second DC/DC converter to cause the second DC/DC converter to produce a second harmonic output current waveform comprising a second characteristic frequency corresponding to the switching frequency of the second DC/DC converter, wherein the second characteristic frequency is different than the first characteristic frequency;

measuring, by the controller, an output current waveform at a measurement point located between the first DC/DC converter and the second DC/DC converter;

applying, by the controller, the FFT to the output current waveform to extract from the output current waveform a maximum frequency;

determining, by the controller, whether the maximum frequency is equal to the second characteristic frequency;

in response to that the maximum frequency is equal to the second characteristic frequency, locating, by the controller, the fault point to be between the first DC/DC converter and the measurement point at which the output current waveform is measured;

in response to that the maximum frequency is not equal to the second characteristic frequency, locating, by the controller, the fault point to be between the second DC/DC converter and the measurement point at which the output current waveform is measured;

blocking, by the controller, the first and second DC/DC converters; and restoring, by the controller, the flexible DC distribution power system.

* * * * *